Nov. 29, 1949     R. ANDERSON     2,489,252

PROCESS OF MAKING ORTHOPEDIC BRACES

Filed April 11, 1944     4 Sheets-Sheet 1

INVENTOR
*Roger Anderson*
BY
*Arnold and Mathis*
ATTORNEYS

Fig. 15

Patented Nov. 29, 1949

2,489,252

UNITED STATES PATENT OFFICE 2,489,252

PROCESS OF MAKING ORTHOPEDIC BRACES

Roger Anderson, Seattle, Wash.

Application April 11, 1944, Serial No. 530,472

7 Claims. (Cl. 128—90)

My invention relates to a process of making an orthopedic brace from a plastic.

Referring more particularly to orthopedic casts and splints, the heretofore most generally employed method for securing immobilization and supporting certain parts of the human body employs plaster of Paris casts. This method generally comprises dipping prepared bandages made of plaster coated strips of cotton fabric into water, disposing the so-moistened plaster bandages in the desired position adjacent the desired part of the body, and allowing the plaster of Paris to set and dry so it will assume its function as a rigid supporting means.

While the conventional plaster of Paris cast is useful in providing valuable therapeutic results, it has many and recognized shortcomings. For example, the cast is characterized by excessive weight, its setting period to obtain maximum strength is long, it remains damp for long periods and thus often provides adverse conditions from a therapeutic standpoint, it is dense, and to a greater degree when wet, to electrical rays, and it is highly absorbent to liquids including body secretions, water and air-borne moisture. The absorbent characteristics of the plaster cast are not only favorable for germ incubation but the strength of the cast is progressively lost depending upon the amount of secretions, water and moisture to which the cast is exposed. These disadvantages and others have provided a long felt need in the art to provide an entirely new type of cast or splint.

In view of this need in the art, I have devoted much of my attention for many years past in research to provide a new type of cast or splint formed from a plastic. In my co-pending applications No. 469,843 and No. 449,890 (now Patents 2,384,804 and 2,373,802) and in my issued Patent No. 2,308,483, I have disclosed and described a new type of plastic cast. A feature of the inventions of said applications and said patent relates to the providing of a multiplicity of discrete pieces of a plastic about or adjacent an injured member and with the pieces contacting to provide a multiplicity of contacting portions. Such inventions function by employing a solvent means for securing the pieces together at their contacting portions. I disclosed that where the discrete pieces were formed of a material as cellulose-acetate that a solvent, as acetone, could be employed. The action of the acetone included the providing of a relatively thin dissolved film on the peripheries of the discrete pieces which upon setting would secure the pieces together at their contacting portions. This limited dissolving of the pieces only on their surface portions was obtained by the physical characteristics of the pieces and thus I was able to provide a quick setting cast and one of substantial strength.

It is a characteristic of plastics that if a substantial amount of the same is dissolved and then the free solvent removed, a gelatinous material remains and which in substantial quantities is characterized by forming an air-excluding surface film so that we have surface hardening or surface film and with very slow internal drying or setting. Thus, such a dissolved plastic in gelatinous form in and of itself is not practical, in accordance with my invention, to provide a cast. In view of the provision of discrete pieces in my inventions in said applications and said patent, I was able to mechanically limit the dissolving of the pieces.

It is further the object of the invention to form a waterproof, relatively rigid, unyielding and inelastic cast or splint which will possess a maximum strength combined with a minimum weight.

It is an object of the present invention to provide a plastic fabrication which is very similar to the touch and in appearance to knitted yarn, as sweater material or stockinette and preferably provide the same in the form of a tubing or a form fitting member or in strips of suitable width and thickness so that such material may be properly fitted or wrapped about or adjacent an injured member and may be thereafter "set-up" to form a cast or splint. One distinguishing feature of my present invention over my inventions in the beforementioned applications and letters patent, is that in my present invention my starting material is of a character, such as fibrous or filament character, so that, if prior art methods were followed, it would interact with normal plastic solvents and gelatinize. In the present invention I control the physical-chemical conditions to limit and/or eliminate the normally expected substantial gelatinizing reaction between a fibrous material and a solvent for such fibrous material.

It is a further object of my invention to provide a cast member characterized in a substantial maintaining of the structural form of the starting material so that the cross sectional characteristics of the cast material, when said material is applied, will be substantially retained in the completed cast to form a truss-like structure in the completed cast.

It is a further object of the invention to provide a bandage-like material of a plastic origin which may be applied without the need of any greater skill than is necessary to apply an ordinary bandage about an injured member.

It is the further object of the invention to provide a treating solution having a predetermined limited or maximum capacity for dissolving portions of the plastic material employed so that a predetermined limited or small amount of plastic may be dissolved and the great bulk of the plastic is not injured either as to form or shape by the treating solution or the dissolved plastic.

It is the further object of the invention to provide a cast which not only rapidly sets but which rapidly dries and one in which the major strength and the dry state of the cast are substantially attained in a matter of minutes—thus providing in a short period for substantial strength and at the same time with the elimination of moisture conditions. The presence of moisture for long periods of time may be conducive to complications such as pneumonia. Also the provision of substantial strength to a cast in a short period of time is often invaluable for therapeutic reasons and to permit a minimum anaesthetic period.

It is another object of the invention to provide a prepared cast-forming material which is flexible, pliable and particularly adapted for conformation in form fitting relation about parts of the human body, a treating solution therefor which may be applied with great latitude of technique and still with certainty of results, and a process for employing the same which is characterized by its ease or simplicity of application so that a perfect fit of the cast may be attained even by less adept physicians and surgeons and with maximum latitude of technic.

It is a further object of the invention to provide a cast which may be readily cut or severed, mechanically, chemically or both mechanically and chemically, for removal, extension, joining, local adjustment, or refitting, and a cast which after severance (or which may require repair for any other reason) may be readily repaired or reenforced without loss of, but usually with, increased structural strength.

It is a further object of the invention to provide a cast-forming material or fabrication in which shrinkage characteristics may be predetermined or eliminated so that in turn the shrinkage during setting of the final cast may be likewise predetermined or eliminated so there result a proper fit or conformation of the cast to the adjacent or encased body portion, and a desirable unity or coherence in the layers of the cast.

It is a further object of the invention to provide a process for pretreating the cast-forming material so that there result control and/or elimination of the shrinkage which would otherwise be brought about upon application of the treating solution to the material.

It is a further object of the invention to provide a practical plastic cast which will be unaffected by moisture, as body secretions, water or air-borne moisture, transparent to electrical rays, such as X-rays, or ultra-violet treating rays, and which may be of an open mesh structure so that the cast will facilitate treatments, such as of the cast or the injured member by liquids of various natures.

It is a further object of the invention to provide an open weave mesh fabric as the starting material wherein by the fibrous or filament character and open weave thereof, the wetting characteristics of the material are enhanced. Because of the use of my treating solution having limited dissolving properties, I am able to use an exceedingly open weave fabric without damage to such fabric, a fabric having exceptional wetting properties, and a fabric having the desired thickness and a minimum weight—thus providing a completed cast of minimum weight and maximum strength.

It is a further object of the invention to provide a cast-forming material preferably having inert threads therein which will aid in control of the shrinkage characteristics during forming my completed cast.

It is a further object of the invention to provide a method of applying the treating solution to provide for economy in use of the treating solution, uniformity of wetting of the cast-forming material by the treating liquid solution, and utmost convenience to the operator in that sufficient solution treated cast-forming material in a closable receptacle will be readily available.

The above mentioned general objects of my invention, together with others inherent in the same, are attained by and illustrated in the structures illustrated in the following drawings, the same being preferred exemplary forms of embodiment of my invention, throughout which drawings like reference numerals indicate like parts.

*Plastic employed*

I employ a plastic which has the following characteristics: It is soluble in the treating solution employed (the relative extent being considered under the title "Treating solution"), it is relatively inelastic, and it is capable of being formed into pieces of threadlike dimension in section and preferably as a fiber or threadlike filament so that a yarn or thread may be provided from the same. Typical examples of such plastics are:

A. The cellulosic plastics

1. Cellulose esters
   a. Cellulose nitrate; R and R'=NO₂
   b. Cellulose acetate; R and R'=OCCH₃
   c. Cellulose acetate propionate; R=OCCH₃; R'=OCC₂H₅
   d. Cellulose acetate butyrate; R=OCCH₃; R'=OCC₃H₇
2. Cellulose ethers
   a. Ethyl cellulose: R and R'=C₂H₅

B. Polystyrene plastics

C. Vinyl ester plastics
1. Polyvinyl acetate

2. Polyvinyl chloride

3. Polyvinyl chloride acetate

4. Copolymers of vinyl acetate and vinyl chloride (The above chemical formulas are the conventional representations of the plastics involved. However, commercial furnished plastics are not completely esterified as might be indicated by the chemical formulas.)

Form of materials

The various individual fibers or filaments of the plastics mentioned in the foregoing paragraph are preferably woven into yarns, such as standard yarns of 150 denier weight. It is to be understood that the foregoing figure of 150 denier weight is not a limitation of this invention but is merely an example of a yarn which may be employed and which is at the same time a standard yarn. Preferably more than one piece of yarn is employed and as a practical example I have employed twelve individual pieces of yarn, each of 150 denier weight, and employed them as a unit in the knitting process.

From the knitting process I preferably obtain, for cast forming purposes, a stretchable and relatively thick fabrication. Thus the type of stitch to be employed in the knitting machine preferably should be one which provides a relatively stretchable fabrication and at the same time the tension on the threads preferably should be relatively loose. As typical examples of various types of stitches which have been employed in the knitting of the fabrication employed in my invention, I have used the following stitches: cuff, link and link, full cardigan, full cardigan with rack, tubular and stockinette.

Figures 4, 5:
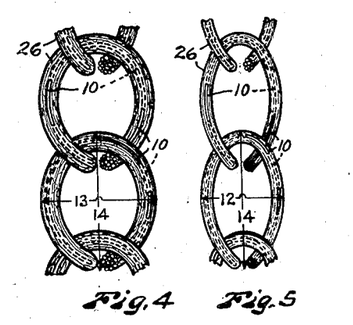
Fig. 4 is a view similar to Fig. 1 of a modified form of fabrication employing therein, in addition to the plastic, an inert thread or yarn.
Fig. 5 is a view of the fabrication of Fig. 4 after final treatment.

While the yarn employed in making the material into a stretchable and relatively thick knitted fabrication may be solely a plastic, I prefer to employ an inert material in each unit of yarn employed in the knitting process to control shrinkage. This material will be inert to the treating solution employed (treating solutions are hereinafter specifically considered) and if the treating solution employs therein acetone then the inert material (that is inert so far as acetone is concerned) may be cotton, regenerated rayon, glass, metal, Nylon, etc. An example of an inert thread employed in the fabrication of my invention is shown in Figs. 4 and 5 of the drawings. In such figures a plurality of plastic threads or yarns are disposed alongside and adjacent inert threads, as an inert thread 10. In the event that an inert thread is employed, it will control adverse shrinkage in the ultimate overall size of the cast.

A theoretical explanation of the operation of the inert thread means is illustrated in Figs. 4 and 5. Fig. 4 illustrates a fragment of the fabrication 26 before treatment and Fig. 5 illustrates the same after treatment. Thus the thickness of the fabrication, as dimension 12 of Fig. 5, appears to be reduced below thickness 13 of Fig. 4 but the length 14 of both figures (a length or width dimension of the final cast) remains substantially constant. The inert thread means, by providing the thick material of Fig. 4 with excess material therein, permits the material to reduce its thickness and preserves the length dimension at right angles thereto.

Figure 1:
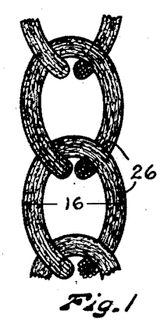
Figure 1 is a fragmentary and somewhat schematic view illustration a fabrication, before treatment, employed in the invention.
Figure 2:
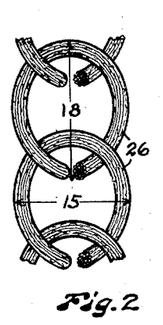
Fig. 2 is a view of the fabrication of Fig. 1 after pretreatment in accordance with my invention.
Figure 3:
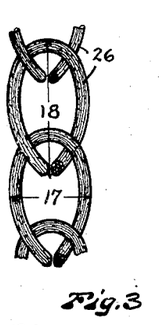
Fig. 3 is a view of the fabrication of Fig. 1 after final treatment.

Fig. 1 illustrates the fabrication 26 before treatment. Fig. 2 illustrates the same after pretreatment in accordance with the technic discussed under "Technic or method of invention, apparatus employing method of pretreating cast-forming material," described hereinafter, and Fig. 3 illustrates the same after final treatment. The threads or yarn of the fabrication as woven (Fig. 1) appear thicker in section and have more "nap" or "fuzz." After pretreating as shown in Fig. 2, the loops have an apparent greater width as dimension 15 of Fig. 2 compared to dimension 16 of Fig. 1. Then after final treatment to provide a rigid supporting means as a cast the dimension 17 of Fig. 3 is reduced over the comparable dimension 15 of Fig. 2. However, the dimension 18 of both Figs. 2 and 3 is substantially constant so the shrinkage of a cast tending to reduce its size is substantially eliminated.

The fabrication is preferably provided in strips which may be of various widths. The exact width of the material will be determined by the type of article which is to be made. In other words, the narrower the strip the easier it will be to conform the strip about an irregular shaped object and at the same time the wider the strip the faster the material may be applied. Thus for practical purposes I have employed strips varying in width from two to ten inches and a length for convenient handling.

Another form of fabrication which I have employed in my invention is knitted tubing or material knitted substantially to the shape of a particular member, as a trunk, leg, etc., such as a stocking.

Other forms of fabrications will include woven material, matted material, intertwined material or intermeshed material. The means for holding the fabrication together so the same may be handled as a unit may be the cross threads of a weave or knit, the entangled threads of matted, intertwined or intermeshed material, or mechanical means as weld-like means, adhesive means, sewing, porous flexible containers, or the like. The requisite characteristic of the fabrication is that it must comprise a plurality of pieces wherein the plastic employed is of filament or threadlike dimension in section and the pieces are interconnected to provide a unit or fabrication. The structures of my earlier mentioned patent and patent applications have a dimension in section of more than one thirty-second of an inch. In such instances the size and dimension of the plastic permitted the use of normal solvents, as acetone, without excess dissolving. In the present invention I employ plastics having a dimension of less than one thirty-second of an inch and which may be termed of threadlike dimension in section. Because of their dimension they would be dissolved, lose shape, take too long to dry or set, or adverse amounts of gelatinous matter would be formed if normal solvents, as distinguished from treating solutions having the limited solubility characteristics herein defined, were employed. Thus the structures or fabrications within the scope of this invention will also include (so long as the cross section of plastic employed is within the present teachings and regardless of whether a solid member of plastic, a hollow member of plastic, or a member coated with a plastic is employed) threads—long or short, tubes—long or short, and other geometric solids, as beads, flat solids, etc. In the event that pieces of short length are employed they may be fabricated to be handled as a unit by employing them within a porous flexible container as a bag. Also, flat solids may be secured together, much like shingles or fish scales, merely at one end. Also, if an inert thread is selectively coated at longitudinally spaced locations, the flexibility of the uncoated portions may be utilized. In the description and in the claims the word fabrication is so used and shall have such meaning unless the context requires a different meaning.

Pretreating of the cast-forming material

Preferably the fabrication previously described is pretreated before application about an injured member so that the subsequent shrinkage characteristic of the material upon final treatment is controlled or eliminated. The most practical technic for pretreating, I have discovered, comprises the use of a liquid, or of heat, or of a combination of the two. A complete description of the pretreating technic will be found in connection with the detailed description of Figs. 16 and 17 and will not be here repeated. However, at this point I desire to point out that in the technic of applying casts, control of the subsequent shrinkage during setting of the cast is highly desirable. In many cases it is desirable that there shall be no shrinkage of the cast and in other cases variations in the degree of shrinkage are desirable for the utmost therapeutic results depending upon the nature of the injury involved and/or the nature of the treatment desired. For example, a cast may be applied about a recently amputated stump where the conditions are such that the surgeon desires pressure to reduce the swelling. In such cases the shrinkage during setting may be had so that pressure is applied to the swollen area. Also in such a type of case, a cast will have an increasingly greater fit or conformation upon the gradual decrease of the swelling. A further advantage from applying my cast in such a case is that a temporary artificial limb may be readily secured to the cast and the patient will be promptly ambulatory. Also a cast may be applied about an injured limb shortly after the fracture and before considerable swelling has set in and in such cases a minimum of shrinkage of the cast in the setting-up process may be desired to allow for the anticipated subsequent swelling. Also a cast may be applied about very bony prominences and where minimum swelling may be expected.

The technic of the use of casts varies with the individual case and the operator and it is not my intention to indicate a method of treatment but merely to indicate some examples showing possible uses of controlling the shrinkage characteristics of the cast during setting.

Treating solution

A prime consideration in my invention is that the treating solution shall be of a character to become saturated at a very low concentration with the plastic employed and/or have the capacity below a predetermined maximum to react with the plastic employed. Such treating solution may be a solvent for the plastic employed, such as ethyl acetate; a solvent for such plastic combined with a diluent, as acetone and petroleum ether; two or more non-solvents for such plastic which in combination act as a solvent, as chloroform and ethyl alcohol; or any of the foregoing which have been first saturated by such plastic.

In the event that my invention is to be employed in connection with the medical and surgical fields in providing casts or splints then the treating solution should be relatively volatile to provide for rapid setting of the cast or splint and rapid drying of solution, should not be harmful or irritating to the skin or exposed flesh or sores, if any, should not be toxic, and should not have an undesirable odor.

In order to determine the amount of a particular plastic required to saturate a particular treating solution (hereinafter termed saturation value of a treating solution), I employed one hundred cc. of the solution being tested and placed therein in finely comminuted form an excess of the plastic to be employed in connection with the particular treating solution and allowed the same to stand in a closed vessel for a substantial period of time to insure complete saturation of the treating solution by the plastic. While the treating solution and the plastic would only be in association with one another for a matter of minutes in actual use in my invention, nevertheless, for test purposes I permitted the treating solution and the plastic to stand in a closed vessel for twenty-four hours to obtain results capable of being duplicated as to saturation values. In view of the fact that an excess of plastic was employed to insure that the solubility characteristics of the treating solution would be fully satisfied some undissolved plastic and usually some gelatinous material were present. Then the liquid was passed through a filter paper so that only dissolved plastic would be present in the liquid filtrate. Thereafter a measured amount of liquid filtrate was evaporated to dryness and the residue weighed.

With such technic for determining the saturation values of treating solutions formed of various ingredients and a specific example of each combination (and to compare the same to the saturation value of pure acetone—with acetone less than enough plastic to leave undissolved pieces was employed so filtering was not needed) in connection with a typical commercial cellulose acetate yarn (at a room temperature of about 70° F.) the following results were observed:

| Treating Solution | Composition (by volume) | Milligrams of cellulose acetate per 100 cc. treating solution |
|---|---|---|
| Acetone | Per cent 100 | over 100,000.0 |
| Acetone<br>Petroleum ether (35°–60° C.) | 68<br>32 | 35.0 |
| Acetone<br>Toluene | 56<br>44 | 76.0 |
| Methyl acetate<br>Petroleum ether (35°–60° C.) | 68<br>32 | 32.5 |
| Methyl acetate<br>Ethyl ether | 60<br>40 | 34.5 |
| Methyl formate<br>Petroleum ether (35°–60° C.) | 70<br>30 | 26.3 |
| Methyl formate<br>Petroleum ether, 37½%<br>Methanol, 2½% | 60<br>40 | 18.3 |
| Methyl formate<br>Ethyl ether | 66<br>34 | 71.3 |
| Chloroform<br>Ethyl alcohol | 99¼<br>¾ | 49.5 |

The striking contrast of the low saturation values of the various treating solutions, set forth by way of example in the previous table, to the extremely high saturation value of acetone, is obviously apparent. This contrast will be helpful in understanding a possible theory involved in my invention. However, in setting forth such a table, it is to be expressly understood that the invention is not limited to the saturation values set forth in said table by way of example and the limits of the invention will be hereinafter defined.

Also, in the table it will be apparent to those skilled in the art that examples of a solvent and a diluent therefor are involved in some of the treating solutions. For example, acetone is a solvent for cellulose acetate, and petroleum ether is a diluent for acetone. However, the acetone and the diluent obviously do not function in direct relation to the amount thereof present, as the treating solution containing approximately two-thirds acetone and one-third petroleum ether (by volume) has a saturation value of 35 milligrams rather than two-thirds of one hundred thousand milligrams.

Figure 15:
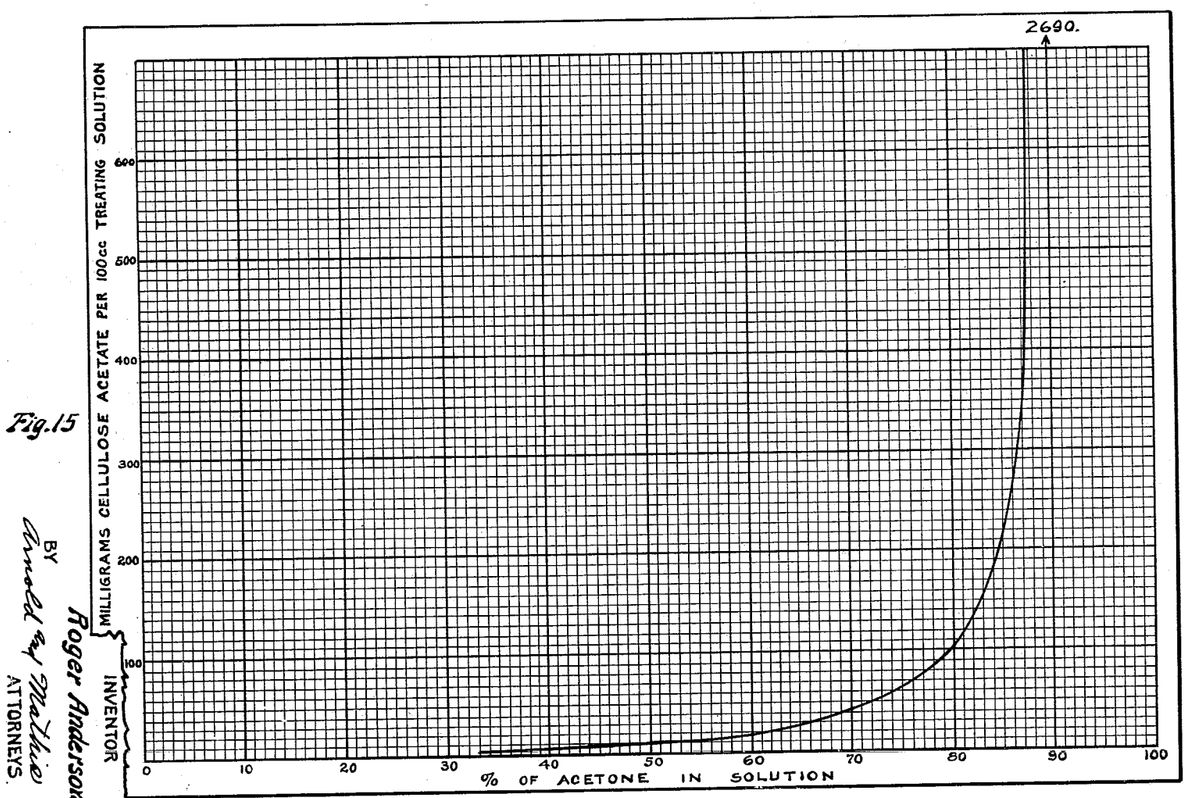
Fig. 15 is a chart comparing the saturation values of a treating solution employed in my invention with the percentage of acetone employed in the said solution.

Referring to the graph, Fig. 15 of the drawings, the ordinates represent milligrams per 100 cc. of treating solution. The abscissas represent the percentage of acetone in a treating solution comprising acetone and petroleum ether. From said chart it will appear that in order to obtain treating solutions having a saturation value of less than 300 milligrams per 100 cc. of treating solution, it is necessary to employ not over substantially 86½% of acetone in the treating solution. Also, in said graph it appears that a solution containing 90% acetone has a saturation value of 2690 milligrams per 100 cc. of treating solution. Thus, the saturation values increase very rapidly in comparison to the percentage of acetone included in the treating solution after a percentage such as 86% of acetone is reached. The percentage of acetone for obtaining any desired value of saturation for a treating solution comprising acetone and petroleum ether is believed obvious in view of said chart.

In view of the fact that those skilled in this art can readily prepare a saturation chart for any of the treating solutions which I have disclosed, I have deemed it unnecessary to here set forth a chart for each treating solution. However, after a saturation chart is obtained for the treating solution embodying the technic which I have hereinbefore disclosed, then a treating solution having the proper saturation value may be readily obtained for a given plastic and employed in my invention. Many of the saturation charts for the treating solutions which I have disclosed will follow generally the curve disclosed in Fig. 15. However, many of the treating solutions of this invention will have saturation value curves which are very dissimilar to the curve represented in Fig. 15. In connection with a treating solution comprising chloroform and ethyl alcohol, I may employ a solution wherein a very small amount of chloroform is present and a very large amount of ethyl alcohol is present, and at the same time I may employ a treating solution wherein a large amount of chloroform and a very small amount of ethyl alcohol are present.

Another type of treating solution which may be employed in the invention includes solutions which have been previously treated with the plastic involved. For example any of the solutions mentioned in the said table may be treated by and even up to saturation by the plastic to be employed and even after substantially complete saturation they are operable in my invention as treating solutions.

Other types of treating solutions described in said table will include a solvent as ethyl acetate or a combination of non-solvents in and of themselves which function in combination as a solvent as chloroform and ethyl alcohol.

A possible theoretical explanation which may be involved in the action of my treating solutions is that one liquid as ethyl alcohol may function as a disperser and another as chloroform may function as a swelling agent. Thus the chloroform may function to swell the plastic so portions will sluff off and/or be made available to be acted upon by the disperser. One of the facts which can be explained by this theory is that solutions containing a large amount of chloroform and a small amount of ethyl alcohol give limited solubility characteristics and at the same time solutions containing a small amount of chloroform and a large amount of ethyl alcohol give similar results. Thus by either controlling the swelling action or by controlling the dispersing action, limited solubility may be obtained. The action to which I have referred as a swelling action may be appropriately referred to as merely a stage of or an action occurring in dissolving. As to treating solutions containing agents, as acetone, it appears that the swelling action, if present, and the dissolving action are brought about by the same agent, acetone, which seems to give credence to the theory that swelling is a stage of dissolving. However, despite the theory involved, my experiments have demonstrated the utility of treating solutions having low saturation values.

Thus my investigation indicates that it is necessary to employ a treating solution having a low saturation value for the plastic employed and/or a treating solution having a capacity below a predetermined maximum to react with the plastic employed and thus provide the necessary setting-up action. Unless such low saturation value of this invention (as distinguished from a higher saturation value) is provided in the treating solution, there is a destruction of the fabrication and its structural form to an adverse degree, and formation of an adverse amount of gelatinous material—these result in prolonged setting and drying time and a thin and weakened cast.

While I am unable at this time to positively state the theoretical reasons for the phenomenon as to why treating solutions having low saturation values are operable in my invention, one possible explanation is that their capacity to dissolve plastic is satisfied before the occurrence of any substantial destruction of the structure of the fabrication and that the dissolved plastic is so dispersed or distributed that substantial quantities of a gelatinous mass are not formed. Also the preferebaly employed highly volatile treating solutions limit the time for the interaction between the treating solution and the plastic so that where said preferable solutions are employed a minimum dissolving of the plastic takes place. Also, a possible feature which may be involved in the theoretical explanation is that there is a capillary attraction between the various hair-like fibers or filaments making up the various pieces of yarn or thread or fabrication and the treating solution, so that in the time involved in the reaction period, the major action is between the treating solution which first wetted the plastic and the plastic itself, and the excess or subsequent applications of treating solution do not bring about excessive dissolving of the plastic.

A possible theoretical reason as to why substantially saturated or partially saturated solutions will be operable in the invention is that of migration or exchange. Even though the treating solution is substantially saturated with the plastic involved, it appears that there is an expelling of the plastic which saturated the solution and a simultaneous dissolving of the plastic to be treated so that by migration or exchange in the treating solution between the plastic initially used to saturate the solution and the plastic being treated, the plastic being treated is properly treated so it will subsequently set-up to provide a practical cast and without adverse destruction of the fabrication.

The setting-up action of my cast involves more than mere evaporation of an extremely dilute cement or adhesive. I have taken a saturated treating solution of the character above discussed and applied the same to a material to which the solution is inert, as cotton, and evaporated all liquid. Instead of finding, as might be expected, some residue encrusting or hardening the cotton, the cotton appeared to be the same as it was before the treatment. There was such a small amount of residue that its presence was difficult to detect by the physical appearance or the "feel" of the cotton. In contrast the same treating solution when applied to a plastic fabrication provides a rigid structure. Thus the phenomenon of the setting-up action of a cast of my invention includes unexpected factors and cannot be explained as being merely the providing of a limited amount of cement in solution and then evaporating the liquid.

It appears that the minimum saturation value of the treating solutions or their apparent capacity to dissolve additional plastic may be substantially zero and such treating solutions will be highly useful in my invention. As to the maximum saturation value for treating solutions which may be employed in the invention, I have found for optimum commercial results in providing casts or splints that the same should be not more than 100 milligrams of plastic per 100 cc. of treating solution calculated at 70° F. It has been found that any greater saturation value than 100 milligrams of plastic per 100 cc. of treating solution is not necessary and limits latitude of technic in that careful handling is required to prevent destruction of the structural form of the plastic fabrication. Thus in my tests I have purposely employed treating solutions having saturation values of not over 75 milligrams of plastic per 100 cc. of treating solution as I obtain the desired strength with the greatest latitude in technic of application. On the other hand, I have found that with careful technic the saturation value may be as high as 300 milligrams of plastic per 100 cc. of treating solution and still useful results will be obtained. Also where the plastic fabrication has been pretreated, as has been discussed under title "Pretreating of the cast-forming material" and will be further discussed in detail in connection with Figs. 16 and 17, the treating solution to be employed may have a higher saturation value than when non-pretreated material is employed. For example, the range of 50 to 150 milligrams of plastic per 100 cc. of treating solution at 70° F. is practical for application to pretreated material. Also in the pretreating process the treating solution should have a lower saturation value than the saturation value of the solution to be employed in the final treatment. I have found for practical purposes that the saturation value for the pretreating solution should be below 75. Thus where an untreated fabrication was employed, solutions having saturation values of over 100 require considerably more care in technic than where a treated fabrication was employed with solutions having the same saturation value. Also, in practical casts I have employed in the pretreating method, a treating solution having a saturation value of 10 milligrams of plastic per 100 cc. of treating solution and when such plastic pretreated cast material was finally treated in the cast-forming operation, it was found that a solution having a saturation value of 70 milligrams of plastic per 100 cc. of treating solution was highly practical.

I have further found that where a plastic fabrication is pretreated with a solution having a rather low saturation value, the loops in the weave are sufficiently self-sustaining so that the tendency of the material to "run" is substantially decreased. This feature of my invention has great utility in the cast field and also has great utility in other fields such as in the treatment of women's stockings or hosiery made of a soluble plastic. The mild or light pretreatment does not too adversely effect a harshness to the material and at the same time it provides sufficient loop retaining characteristics so that there results a practically run-proof product. The mild treating solution to be thus employed should have a saturation value in the neighborhood of 10 milligrams per 100 cc. of treating solution at 70° F. As the strength of solubility of the treating solution increases it increases the harshness of the material so that the treating solution, for practical purposes, should be the lowest treating solution which will provide the desired run-proof characteristic.

It is interesting to note the very small total weight of the cast material which normally will be dissolved by the treating solutions of this invention. A considerable excess of treating solution for a given cast was applied and the capacity of such solution to dissolve the plastic involved was determined. It was found that the weight dissolved was less than one-half of one percent (.5%) by weight which again illustrates the low saturation values here involved.

In the event that the plastic material employed is other than cellulose acetate, obviously those skilled in the art can readily ascertain a treating solution for the plastic material employed and provide the same with a saturation value in accordance with the foregoing teachings to thereby obtain the benefit of my invention and employ various plastic materials.

*Technic or method of invention, apparatus employing method of pretreating cast-forming material*

Figure 16:
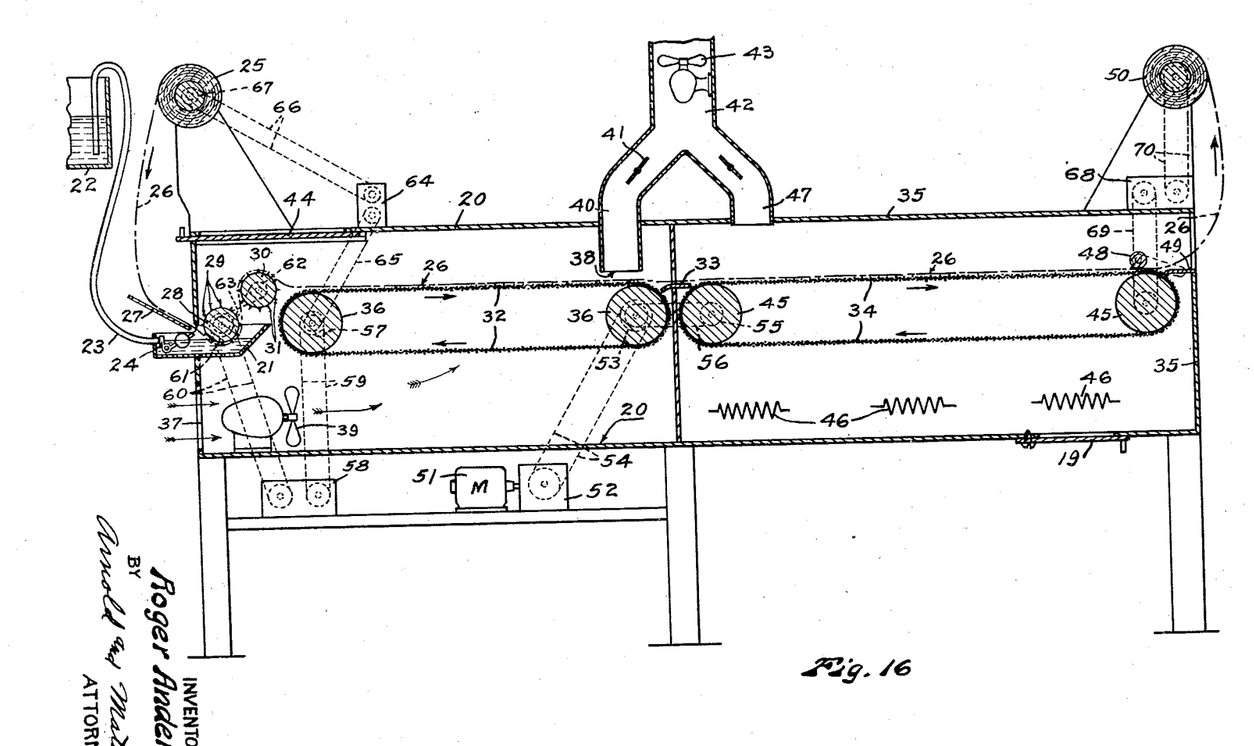
Fig. 16 is a longitudinal sectional view, with parts shown in elevation, and with parts shown somewhat diagrammatically, of a device employing a fabrication pretreatment method of my invention.
Figure 17:
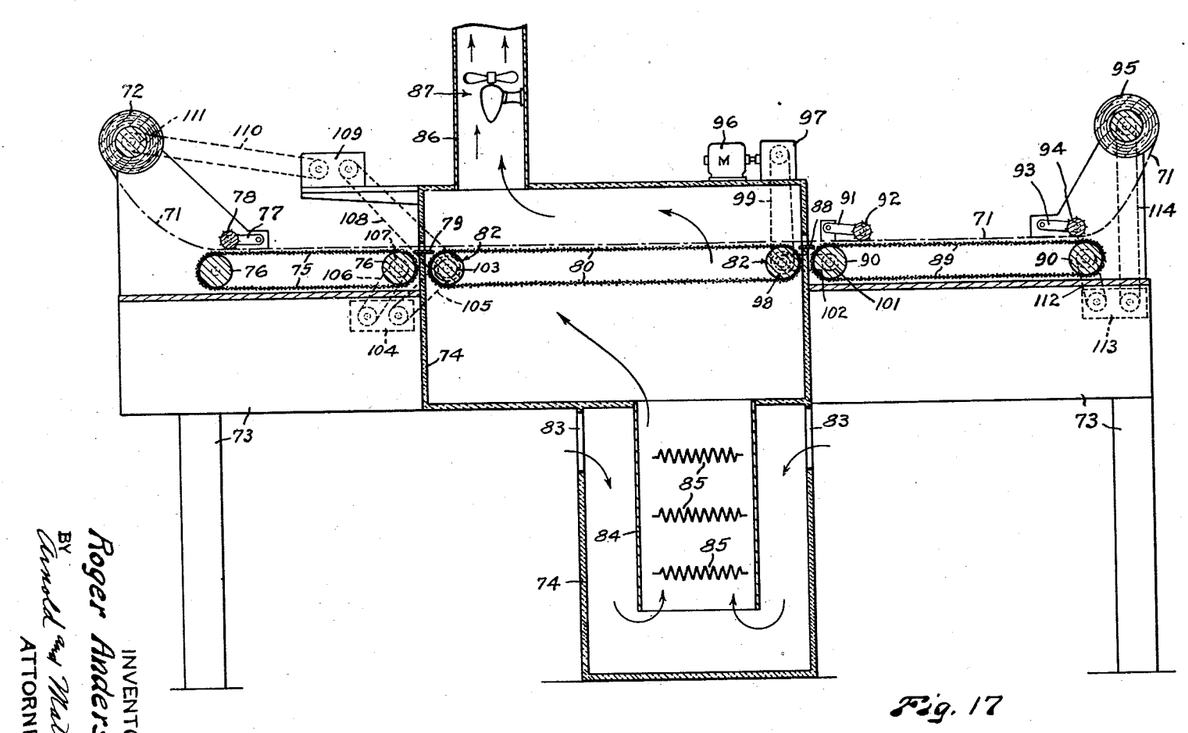
Fig. 17 is a view similar to Fig. 16 showing a device illustrating a modified fabrication pretreatment method.

Referring particularly to Figs. 16 and 17 of the drawings, a device embodying my method of pretreating the plastic cast-forming material is illustrated. This device employs a treating solution in the pretreating process, but my invention can also employ either heat alone or a treating solution plus a heat treatment.

Also, the device as illustrated provides for immersion of the fabrication in the treating solution and my process also includes, spraying, applying with a brush or the like, or pouring the treating solution on the fabrication.

The device comprises a frame and housing means 20. A liquid trough means 21 is disposed at the inlet portion of the housing means 20. In order to provide the desired liquid level of treating solution in the trough 21, I provide a source of supply of treating solution 22, syphon conduit means 23, and float valve means 24—thus a predetermined liquid level of treating solution is maintained in the trough 21.

A source of material to be treated is carried by driven roll 25. The material 26 to be treated (the nature of which has been hereinbefore discussed in connection with the titles "Plastic employed" and "Form of materials") passes downwardly from the driven roll 25 and is supported by guide plate 27. The guide plate 27 is inclined downwardly and due to the weight of material and the loose stitch of the fabrication, the material tends to crowd together or reduce its length. As the fabrication 26 leaves the guide plate 27, it passes under driven feed roll 28 which is provided with peripherally positioned spikes or pin means 29. The fabrication 26 in passing under and around the driven feed roll 28 passes below the surface of the liquid treating solution in the trough 21, and the spike means 29 tend to maintain the excess material or the shortened length of the fabrication as the same passes around the driven feed roll 28. The fabrication 26 then passes upwardly and over a second driven feed roll 30 which is provided with spike means 31 which are similar in nature to the spike means 29 of the driven roll 28. Thereafter the material is delivered from the feed roll 30 onto a driven endless conveyor belt 32. In a typical installation a treating solution having a saturation value of 10 (in accordance with a standard hereinbefore mentioned) was employed and the feed of fabrication was regulated so the fabrication was immersed in the treating solution for about one and one-half seconds. However, with change of saturation value of the solution, change of period of immersion is preferable. The endless conveyor belt 32, the feed rolls 28 and 30, and the trough 21 are all formed of materials which will not be affected by or affect the treating solution. Also the endless conveyor belt 32 is a porous belt such as a perforate wire belt so that air may be passed through said belt and through the fabrication 26 resting on the conveyor belt 32. Material discharging from the endless conveyor belt 32 is supported by a plate 33 and from there is delivered onto an endless conveyor belt 34 in a second housing 35.

The endless conveyor belt 32 is supported on driven rolls 36, and the speed of travel of the endless conveyor belt 32 is slightly less than the peripheral travel of the driven rolls 28 and 30. Thus material leaving the second driven feed roll 30 will be crowded or the length of the fabrication will be shortened. Thus in two instances, namely, between the delivery of material from the roll 30 to the conveyor 32 and from the delivery of the material from the guide plate 27 to the roll 28 provision is made to crowd, or longitudinally shorten the fabrication 26. In view of the pretreating action of the solution in the trough 21 provision is made to maintain the fabrication 26 in its shortened length which is obtained from said mechanical means just described and also said solution functions to shrink the fabrication 26.

The housing means 20 preferably completely encloses the fabrication 26 while the same is being treated except for the inlet and outlet means for the fabrication and an inlet means 37 and an outlet means 38 for the admission and exhaustion of air. In close proximity with the inlet 37 is preferably provided a driven fan 39 which will augment the amount of air passing into and out of the housing 20. The air leaving the fan 39 passes upwardly through the conveyor 32 and through the fabrication 26 disposed on the upper flight of said conveyor 32. After the air has passed through the material on the endless conveyor belt 32 it passes out outlet 38 and up conduit 40. Preferably conduit 40 is provided with damper means 41 to adjust the size of the opening of said conduit. Preferably the conduit 40 connects with a conduit 42 in which is disposed a fan 43 which augments the exhaust of gases out said conduit 42.

At the inlet end of the machine preferably is provided a sliding door 44 which is preferably made of glass to provide both visibility and accessibility to the interior of the housing means 20.

The fabrication 26 has first been crowded or shortened longitudinally, and then has been immersed in a treating solution in the trough 21. Thereafter the feed rolls 28 by reason of their spiked peripheral portion have maintained such shortened longitudinal length and then thereafter the fabrication 26, which has been immersed in the treating solution, is again crowded onto the conveyor belt 32 and the longitudinal length has again been shortened. Thereafter by a drying operation the wetted pretreated fabrication 26 has been dried and the action of the pretreating solution is to loosely set or maintain the fabrication 26 in its shortened longitudinal length. This portion of the process is a mechanical shortening of the fabrication 26. At the same time the treating solution in the trough 21 will have a physical-chemical reaction with the fabrication 26 and upon the drying of the fabrication there is a shrinkage of the fabrication 26 in all directions. Also in the physical-chemical reaction of the treating solution with the fabrication 26 any excess material which has been crowded in the fabrication 26 will be maintained in the fabrication 26 and in fact I have found in actual tests that the thickness of the fabrication 26 may be increased because of the pretreating process. The fabrication 26 before treatment is diagrammatically shown in Fig. 1 of the drawings and said fabrication after treatment is diagrammatically shown in Fig. 2 of the drawings. It will be noted that while the length of the loops have been shortened, their thickness or dimension at right angles to the length has been increased by the pretreatment process.

In order to maintain the mechanism within reasonable commercial length limitations, preferably the fabrication 26 leaving or discharging from the conveyor belt 32 is passed through the second housing 35 and there subjected to heat of a temperature to remove all traces of liquid resulting from the treating solution. Obviously if the endless conveyor belt 32 were of sufficient length and sufficient air were passed through the fabrication 26 thereon, the material could be completely pretreated and dried in the housing 20. In view of the fact that some of the preferably employed volatile solvents are inflammable, in the interest of caution, a separate housing 35 is illustrated in order that heat may be safely applied in the drying process.

Within the housing 35 is provided the conveyor belt 34 which is similar in structure to the conveyor belt 32 and the same is supported by driven feed rolls 45. Below the conveyor belt 34 and within the housing 35 is disposed a plurality of heater means 46, which may be heated by any suitable source, such as electricity. The heat rising from the heaters 46 passes through the conveyor belt 34 and through the fabrication 26 disposed on the upper flight of said conveyor belt. In order to provide a source of air for the housing 35, preferably I provide an adjustable closure means 19 adjacent an opening in the bottom portion of the housing 35. The warm air rising in the housing 35 passes out through conduit 47 which is connected with conduit 42. In view of the fact that I am merely providing a drying action in the housing 35 to remove any trace of treating solution, and in view of the fact that the treating solution preferably contains a highly volatile solvent and may therefore be somewhat explosive, the temperature and volume of air within said housing 35 should be regulated to prevent ignition of any liquid remaining on the fabrication 26 when the same is within the housing 35.

Toward the discharge end of the conveyor belt 34 is provided an idler roll 48 which functions as a hold-down means for fabrication 26 on the conveyor belt 34. Fabrication 26 discharging from the conveyor belt 34 passes over plate 49 and then is wound on driven roll 50.

In Fig. 16 of the drawings there is shown diagrammatically the driving connections of the various driven rolls before mentioned. In said Fig. 16, 51 represents a prime mover as a motor which is connected with a speed reduction means 52 (diagrammatically shown). The outlet from the speed reduction means 52 is connected with a sprocket 53 by way of a link belt 54 and said sprocket 53 is carried by one of the driven rolls such as 36. A means of connecting the various driven rolls together comprises a sprocket 55 carried by roll 45 and a link belt 56 between sprockets 53 and 55. The conveyor belts 32 and 34 may be utilized in transmitting rotary movement between the two driven rolls 36 and the two driven rolls 45 respectively. The driven roll 36 at the intake end of the machine is provided with a sprocket 57 which is connected to speed regulator 58 (diagrammatically shown) by means of a link belt 59. The speed regulator 58 is connected by a link belt 60 with a sprocket 61 on driven roll 28. A means for interconnecting driven rolls 30 and 28 so the same will rotate in opposite directions comprises sprocket 62 carried by roll 30 and link belt 63 which interconnects sprockets 61 and 62. Thus the peripheral speed of the rolls 28 and 30 may be adjusted relative to the peripheral speed of the rolls 36 and in turn of the conveyors 32 and 34. The regulator 58 is of the manual adjustable type so that adjustment for different types of weave or stitches of fabrication is possible. In order that the lineal feed or discharge of fabrication 26 from the roll 25 shall remain constant irrespective of the size of the roll of fabrication 26 on said roll 25, I provide a speed regulating means 64 (diagrammatically shown) and connected with sprocket 57 by means of link belt 65. This speed regulating device is preferably of an automatic type and is connected by a link belt 66 with a sprocket 67 carried by roll 25.

Referring to the discharge end portion of the machine, the driven roll 45 at said end is connected with the take-up roll 50 through a speed regulating device 68 (diagrammatically shown) by means of link belts 69 and 70 and thus the peripheral speed of fabrication 26 fed onto roll 50 will be the same despite the fact that the size of roll formed by the material is increasing with production.

In view of the fact that material discharging from the roll 25 is being crowded and longitudinally shrunk it is desirable that the roll 25 be driven and that there be no strain or pull on the material as the same is being fed. Also preferably similar results are desired in connection with the take-up roll 50 so that after the material has been treated it is not stretched.

As the peripheral speed of the rolls 28 and 30 are the same and such speed is slightly greater than the peripheral speed of the conveyor 32, there is a physical crowding of the material together or shortening of longitudinal length of the same when it is deposited on the conveyor 32. The amount of this physical crowding I have found preferably to be the maximum which a particular knit or stitch will permit. Thus if the fabrication 26 is very loosely knit and a great crowding is permissible, then the rolls 28 and 30 will have a substantial increase of speed over the peripheral speed of the conveyor 32. In some stitches I have found that it is possible to longitudinally shorten, during the pretreating process, twelve longitudinal feet of material into ten longitudinal feet. One test for determining the preferable relative peripheral speed of the rolls 28 and 30 as compared to the conveyors 32 and 34 is to crowd all the material that is possible onto the conveyors so long as the material lies flat and does not buckle.

I have found that a method employing my treating solution in pretreating the fabrication without the use of the mechanical crowding is highly useful, and it is to be understood that the use of both the treating solution and the mechanical crowding is a preferable method but not an essential one.

Also, in the device of Fig. 16, I have provided for drying of a fabrication which has been mechanically crowded and treated by the treating solution. For such drying, the material is preferably supported on an open mesh conveyor and heated air is passed through the conveyor and the supported material.

Referring particularly to Fig. 17 of the drawings, a device embodying my method of pretreating the plastic cast-forming material where heat is employed is illustrated. The materials to be treated in said device may be the same as fabrication 26 discussed in connection with Figs. 1, 2, and 16, either before or after treatment by the apparatus disclosed in Fig. 16. Obviously, if the fabrication 26 has been treated by the treating solution of the before mentioned Fig. 16, the treatment should be rather light if a subsequent treatment is to be made in the device of Fig. 17.

Plastic fabrication material 71 is disposed on feed roll 72 and the same respectively correspond to fabrication 26 and feed roll 25 of Fig. 16. Frame means 73 supports a housing member 74 and also the various other structures. A conveyor 75 is supported by driven roll 76. The conveyor 75 is similar to the conveyors 32 and 34 of the previous Fig. 16. Above the conveyor 75 are mounted pivoted arms 77 (only one of which appears in the elevation—Fig. 17) and the free ends of said arms 77 support a peripherally spiked roll 78, which is preferably an idler roll. The construction of the peripherally spiked roll 78 is similar to that of rolls 28 and 30 of the previous figure. As one form of spikes, there may be employed standard steel phonograph needles projecting radially from the roll with their pointed ends about $\tfrac{3}{16}$ inch from the periphery thereof.

Plastic fabrication 71 is fed from feed roll 72 between idler roll 78 and driven conveyor 75 and thence to and over plates 79 and onto conveyor 80 which is disposed within the heat chamber provided by housing 74. The conveyor 80 is supported by driven roll 82 which provides a peripheral speed to the conveyor 80 which is less than the peripheral speed of the conveyor 75. Thus I provide a crowding action of the material and reduce its longitudinal length while the material is being subjected to the heat treatment within the housing 74. The structure in the figure herein discussed is slightly different from the structure in Fig. 16, but in each instance I provide means for crowding the material or reducing the length of the material so the same may be subjected to treatment while in such condition. In each instance mechanical means of slightly different nature are employed and substantially the same crowding action results.

It is desired that the plastic fabrication 71 shall be subjected to a temperature of about 375° F. for a period of approximately 25 seconds. A way of providing such temperature is to form the walls of the housing 74 from heat insulating materials. Openings 83 provide for the inlet of air, and the air passes downwardly between the walls of the housing 74 and the inner walls 84. Within the chamber formed by the inner walls 84, electric heaters 85 are disposed and the air passes downwardly outside the walls 84 and upwardly inside the walls 84 and past the heaters 85. Air rising past heaters 85 passes through the perforate metallic conveyor 80 and through material 71 disposed on said conveyor. Then the heat passes out of the heating chamber via conduit 86 which is preferably provided with a fan 87 therein to aid in circulation. In heat treating the material moisture, oils commercially used in surface coating, and plasticizer from the acetate, are gasified, and therefore preferably I desire not to recirculate the gases but to exhaust the same via conduit 86.

Material leaving the heating chamber formed within housing 74 passes over plate 88 and onto a conveyor 89.

The conveyor 89 is supported by driven rolls 90 and the conveyor 89 has the same travel as conveyor 80. Above the conveyor 89 are disposed pivoted arms 91 and 93, and the free ends of the pivoted arms 91 and 93 respectively support peripherally spiked rolls 92 and 94, which are preferably idler rolls. Material received on conveyor 89 passes thereon and below spiked idler rolls 92 and 94 and then is wound on driven take-up roll 95. This driven take-up roll 95 corresponds to the roll 50 of the previous Fig. 16.

In said Fig. 17 of the drawings there is shown diagrammatically the driving connection of the various driven rolls. 96 represents a prime mover as a motor which is connected with a speed reduction means 97 (diagrammatically shown). The outlet from the speed reduction means 97 is connected with a sprocket 98 by way of a link belt 99 and said sprocket 98 is carried by one of the driven rolls such as 82. A means of connecting the various driven rolls together comprises a sprocket 101 carried by roll 90 and a link belt 102 between sprockets 98 and 101. The conveyor belts 80 and 89 may be utilized in transmitting rotary movement between the two driven rolls 82 and the two driven rolls 90 respectively. The driven roll 82 at the intake end of the machine is provided with a sprocket 103 which is connected to a speed regulator 104 (similar to speed regulator 58 of Fig. 16) by means of a link belt 105. The speed regulator 104 is connected by a link belt 106 with a sprocket 107 on a driven roll 76. The driven rolls 76 are interconnected by conveyor 75 so the same are both driven.

By manual control of the speed regulating means 104 (similar to speed regulating means 58 of the previous Fig. 16), variations in the rate of speed between conveyors 75 and 80 may be provided so that conveyor 75 will crowd excess material onto conveyor 80 and to the extent described in connection with Fig. 16.

A link belt 108 interconnects driven sprocket 103 with a speed reduction device 109 which is similar to the speed reduction device 64. The speed reduction device 109 interconnects with a sprocket 111 carried by roll 72 through link belt 110. Thus the rate of feed of fabrication 71 from supply roll 72 may be regulated by speed regulator 109 similar to the action described in connection with the regulation of feed from the feed roll 25 of Fig. 16.

Both rolls 90 are driven as they are interconnected by conveyor 89. The driven roll 90 at the discharge end of the machine is connected to fabrication take-up roll 95 via link belt 112, speed reduction device 113, and link belt 114. The parts 112, 113, and 114 correspond respectively to the parts 69, 68, and 70 of Fig. 16 and have similar functions.

The range of temperature to be employed within the housing 74 and the time of treating the plastic fabrication 71 therein will depend upon the extent of pretreatment of the fabrication and the amount of shrinkage desired. Also it may be that the fabrication has been pretreated in the machine of Fig. 16 with a treating solution so that the treating to be accomplished in the machine of Fig. 17 will be relatively light. Also, it may be that it is not desired to remove all of the shrink from the material and for such reason a lighter treatment may be desired. For practical purposes I have determined that the range of temperature in the heat treating chamber 74 may be between 350° F. and 425° F. and that the material will be in said device and exposed to said heat (by being contacted with a heated fluid—a gas or a fluid—heated air being shown by way of example) for a period of 30 to 10 seconds. Furthermore, in considering the amount of pretreatment to be employed it is highly desirable to reduce the same to a minimum as the greater the pretreatment the harsher or more set is the material. It appears that even if the pertreatment is rather light, still, all detrimental shrinkage may be removed and at the same time the material can be maintained rather soft and smooth feeling to the touch and therefore has highly desirable qualities as a prepared plastic cast-forming material.

Thus in the pretreatment process, a liquid treatment, a heat treatment, or a combination of the two may be employed but preferably a liquid treatment in whole or in part is employed as a more uniform treatment, cross sectionally considered of the plastic, seems to result.

*Application of plastic fabric*

In the event that the invention is employed in providing a cast or splint, preferably the skin area to be contacted by the cast shall be covered with a material inert to the treating solution, such as stockinette, sheet wadding, felt or rayon bandage. In the event that it is desired to apply the cast directly adjacent the skin of a patient, the comfort of the patient will be enhanced by shaving off any hair and applying a greasing coating as a viscous mineral oil.

Over the skin or over the padding layer, the plastic material in strip or bandage form is wrapped. In many cases it may be desired to wrap more than one layer from the strips being employed and in many cases it may be desired to wrap one layer with the joints lapping at approximately the center of the bandage and then to apply a second layer where the joints between adjacent edges are butted or a second layer in the form of a tubular member. In the event that the cast is to be formed of two layers it is preferable to apply the first plastic layer wetted with treating solution and the second plastic layer dry. However, either layer may be applied wet or dry. I have found very desirable results may be obtained if the first layer comprises a plastic fabrication pretreated in accordance with the before mentioned method and then, after said layer has substantially set, to apply a second plastic layer of non-pretreated material—for appearance this may be a tubular member to thus provide a continuous exposed surface. By applying an outer non-pretreated layer it tends to shrink onto the first layer and unify the cast and at the same time the under layer of pretreated material will not shrink upon setting because of the pretreating method and thus I have a well conforming and unified cast.

Figures 6, 7:
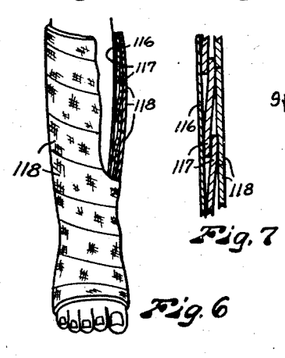
Fig. 6 is a fragmentary view with portions shown in section and portions in elevation of a cast of my invention applied about a portion of the human body.
Fig. 7 is an enlarged fragmentary view of parts shown in section in Fig. 6.

Referring to Figs. 6 and 7 of the drawings, 116 indicates the inert padding material, 117 indicates the first layer wherein adjacent portions are provided with lap joints, and 118 indicates the outer layer wherein the joints are preferably butted.

Figures 8, 9:
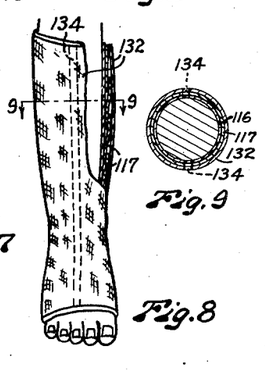
Fig. 8 is a view similar to Fig. 6 except that the outer layer of the cast is provided by a tubular member instead of a bandage.
Fig. 9 is a sectional view taken substantially on broken line 9—9 of Fig. 8.

Referring to Figs. 8 and 9 of the drawings, 116 again represents inert padding material, 117 again indicates the first layer and 132 represents the outside stockinette or tubular layer formed of one piece.

In applying the treating solution to the plastic fabrication, the fabrication may be wetted with treating solution before it is applied or else the plastic fabrication may be applied and then the same wetted. In order to apply the treating solution to the plastic fabrication, the plastic fabrication may be immersed in treating solution or the treating solution may be poured on, applied by a syringe or spray gun, or applied by a brush to wet the plastic fabrication. A very practical way of applying treating solution to a plastic fabrication, however, is by a syringe emitting a small stream or spray of treating solution. Also, if the plastic fabrication is to be immersed in the treating solution a very practical method is by the device shown in Fig. 14 of the drawings.

Figure 14:
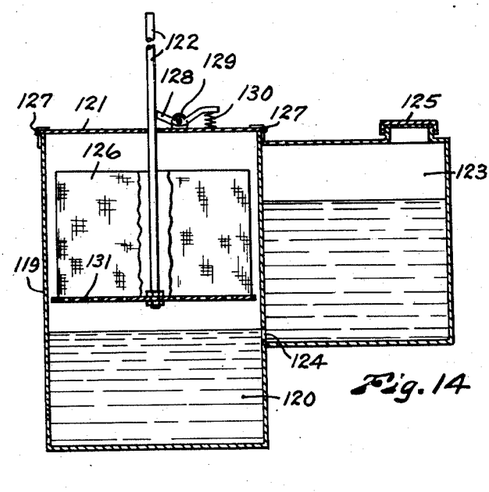
Fig. 14 is a view with parts shown in section and parts shown in elevation of a device which may be employed in applying treating solution of my invention to the fabrication of my invention.

In said Fig. 14, 119 represents a container to provide therein a chamber 120. A split cover member 121 has its end portions hinged by hinge means 127 to the container 119. Intermediate the two pieces forming the cover member 121 is provided an opening through which a rod 122 may be slidingly moved. Preferably a catch means 128 is hingedly supported on the cover member 121 by pivot means 129 and a spring means 130 angularly moves the catch means 128 into engaging relation with a rod 122. Thus if the rod 122 is moved upwardly it is only necessary to hold the cover means 121 downwardly and after the rod 122 is positioned in its desired upper position it will be held in such upper position by reason of the catch means 128. A reservoir 123 for treating solution is provided and said reservoir 123 communicates with the chamber 120 via port 124. A screw cap 125 is provided to function as a filling means and also as a means to seal the reservoir 123. The size of the port 124 is such that the treating solution in the reservoir 123 will be delivered into the chamber 120 in a rather small stream and at the same time the liquid level in the chamber 120 will be up to the level of the port 124. A tray-like member 131 is provided on which a roll of plastic fabrication 126 may be disposed.

In the operation of the device shown in Fig. 14, a roll of plastic fabrication is disposed about the rod 122 and on the tray 131. Then the cover means 121 is opened and the tray 131 with the fabrication 126 thereon is lowered into the chamber 120 and below the liquid level of the treating solution in said chamber 120. After the plastic fabrication 126 has been thoroughly wetted then the rod 122 is moved upwardly and by reason of the catch means 128 it is retained at a level above the liquid solution in the chamber 120. Thus in an operating room the fabrication 126 will be maintained in a closed container. Also at the same time, in view of the preferable volatile nature of the treating solution in the chamber 120, fumes of said treating solution will be present so that a wetted fabrication may be maintained in a wetted condition and in the absence of drying conditions so that it will be readily available so that as the physician needs further wetted fabrication in applying a cast there will also be a supply readily available for him.

While it is possible to provide an open container of treating solution and to immerse the fabrication 126 therein such procedure is not desirable and at the same time the volatile treating solution will be evaporating and thus a device embodying the structure of said Fig. 14 proves to be very practical. It can be readily understood that it requires a mere movement of the rod 122 upwardly to remove the fabrication 126 from the treating solution and at the same time when the fabrication is first placed on the tray 131 that as the cover means close, the fabrication may be at once immersed in the solution in the chamber 120 or the fabrication may be maintained at a level above the solution by reason of the catch means 128 and thereafter immersed as and when desired by the physician.

When a plastic fabrication is immersed in a treating solution of my invention, I have found that some of the treating solutions tend to be selectively exhausted as to one or more of the components of the treating solution and therefore it is desired to periodically replace the treating solution into which the fabrication is to be immersed so that the saturation value of the treating solution may be maintained within the desired range.

In the event that the liquid draining from an immersed fabrication is not permitted to deposit in the treating solution, then of course it will not be desirable to periodically replace the treating solution.

Figure 10:
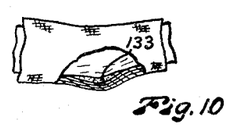
Fig. 10 is a fragmentary view and with portions shown in elevation and portions shown in section to illustrate the use of padding means between a sore spot or bony prominence, as an elbow, and a cast of my invention.

In the event that a cast is to be applied over surfaces, such as bony prominence or sore spots, it may be desired to provide a padding at such locations and this may be readily accomplished in my invention. Referring to Fig. 10 a padding material 133 such as cellulose acetate staple, or sheet wadding, or soft glass wool is disposed adjacent the local area and the cast material formed thereover so that the desired padding structure is present. In the event that the padding material employed is a cellulose acetate staple, the outer portions will be adhered to the cast and the inner portions will remain untreated in view of the resistance to wetting or being penetrated by a liquid of the cellulose acetate staple. In said Fig. 10 the balance of the cast may follow the structures of either Figs. 6 and 7 or Figs. 8 and 9.

In the event that it is desired to provide expansion joints or local areas in the cast which are not to be set-up, this may be accomplished by employing a material which will not be affected by the treating solution, will not be washed off or dissolved by the treating solution, and one which will envelop or encase a portion of the fabrication so that such fabrication in such area cannot be affected by the treating solution. As an example of such a substance which may be employed with the fabrication and the treating solution of this invention a thin jelly-like solution of gelatin and water may be employed. Furthermore such jelly material may be washed or brushed out after the cast has been set-up and then upon removal of the jelly, the portion of the cast which was protected by the jelly may be subjected to a treating solution and such portions then set-up.

Referring particularly to Figs. 8 and 9, 134 represents areas which have been protected so that the same have not set-up and may provide expansion joints. The method to be employed in providing non-set-up portions of a cast is more fully disclosed in my copending application Serial No. 469,843, the difference in the present instance being in the nature of the fabrication, the treating solution, and the coating material.

Another feature of my invention relates to the cutting of a cast so that the cast may be removed, repaired, or adjusted. In the prior art of plaster of Paris casts, the task of severing the cast in many cases, as a body cast, was such a strenuous and tedious task that it has been termed a "hammer and chisel job." As distinguished therefrom, in my cast the same may be chemically or mechanically severed or a combination of the two may be utilized and at the same time with a minimum of effort. Preferably an inert absorbent material, as sheet wadding, is applied over the area (local or for the length of the cast) on which the cut is to be made. Then acetone is sprayed or applied to the sheet wadding. The sheet wadding functions to provide acetone in the desired area or region and at the same time the acetone can function as a dissolving agent of the cast. The cast which has been so treated has been found to be readily severable so that it is only necessary to use ordinary bandage shears and the cast may be severed or local areas removed as may be desired. Thus I have been able to supplant the old process which was involved in plaster of Paris casts and which was a "hammer and chisel task" to a procedure wherein the cast may be severed by mere bandage shears. Even if the acetone is not applied to provide the dissolving action above described, it has been found that the cast may be severed with greater ease and with less difficulty than was required with the old plaster of Paris cast.

Figure 11:
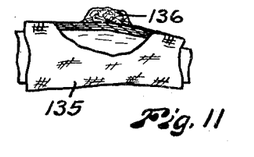
Fig. 11 is a fragmentary view with portions shown in elevation and portions shown in section to illustrate a means of applying a solvent to remove portions, as a regular or irregular shaped hole, of a completed cast of my invention.
Figure 12:
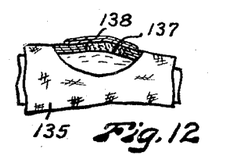
Fig. 12 is a fragmentary view with portions shown in elevation and portions shown in section of a completed cast of my invention in which an opening has been provided and the cast then repaired.

Referring to Fig. 11 of the drawings a completed cast 135 is illustrated as having disposed thereon sheet wadding 136. Thereafter the sheet wadding 136 is wetted with acetone and a desired local area of the cast 135 is so dissolved or softened that it may be readily removed or reshaped. Preferably the material will merely be reshaped, as an opening may cause window edema. However, if an opening is provided, then as shown in Fig. 12 of the drawings, the material 137, which may be similar to material 136 of Fig. 11, is preferably disposed in the opening provided in the cast 135, and cast-forming material 138 may be applied and the same may be adhered to and form an integral part of the cast 135. Thus, in the event of sore spots developing under a cast, portions of the desired shape of the cast may be softened, reshaped, refitted, or removed, the pressure removed and the cast repaired to original strength. The lack of such characteristics has been one of the major shortcomings of plaster of Paris casts.

After a cast involving my invention has been severed, it may be readily repaired and then a coating material embodying the fabrication of my invention may be applied and then upon the application of further treating solution, the patch or repair material will be firmly adhered to the cast and the cast will have its original strength. In the past where plaster of Paris casts were employed, the strength of the cast depended upon the maintaining of its original structural form and any repair caused a weakening of the cast unless the repair work in substance involved the making of a new cast.

Figure 13:
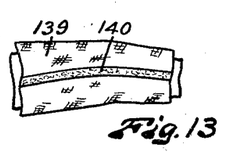
Fig. 13 is a view similar to Fig. 11 except that the nature of the opening to be provided in the cast is a long narrow slot such as may be employed in severing and removing the cast.

Referring to Fig. 13 of the drawings a fragment of a cast 139 is illustrated and padding 140 similar to padding 136 of Fig. 11 is shown. Thus in the event that it is desired to provide slits in a cast to remove the cast or to adjust the cast for size, it is only necessary to provide the material 140 to form a strip and then acetone may be applied to the material 140 to dissolve the cast. Thereafter by bandage shears the cast may be severed for removal or adjustment. If the cast is severed for adjustment then a strip of bandage material may be applied similarly to the description in connection with Fig. 12, and the cast repaired after the adjustment has been made.

This invention accomplishes the various objects which were set forth in the first part hereof and provides further results which have been set forth in the description of the various structures and methods. It is believed the same are therefore sufficient without further setting forth the same at this place.

Obviously, changes may be made in the forms, dimensions, and arrangements of the parts of my invention, without departing from the principles thereof, the above setting forth only preferred forms of embodiment.

I claim:

1. In the process of making an orthopedic brace, the step which comprises thoroughly wetting a fabric formed of plastic fibers which is soluble in a volatile organic setting agent, the setting agent being characterized by having a saturation value for the plastic of between 50 milligrams and 300 milligrams per 100 cubic centimeters of setting agent at 70° F., whereby upon allowing the solvent to evaporate there is formed a brace of substantially unyielding and inelastic construction.

2. In the process of making an orthopedic brace, the step which comprises thoroughly wetting an open mesh fabric formed of plastic fibers which is soluble in a volatile organic setting agent and which open mesh fabric incorporates therein pieces of reinforcing material insoluble in said setting agent and which reinforcing material functions to aid in maintaining the form of the fabric when wetted, the setting agent being characterized by having a saturation value for the plastic of between 50 milligrams and 300 milligrams per 100 cubic centimeters of setting agent at 70° F., whereby upon allowing the solvent to evaporate there is formed a brace of substantially unyielding and inelastic construction.

3. In the process of making an orthopedic brace, the steps which comprise pre-shrinking a a fabric formed of plastic fibers which is soluble in a volatile organic setting agent; and subsequently, for application as a brace, thoroughly wetting such fabric by a volatile organic setting agent in which the same is soluble, the settting agent being characterized by having a saturation value for the plastic of between 50 milligrams and 300 milligrams per 100 cubic centimeters of setting agent at 70° F., whereby upon allowing the solvent to evaporate there is formed a brace of substantially unyielding and inelastic construction.

4. In the process of making an orthopedic brace, the steps which comprise pre-shrinking a fabric formed of plastic fibers which is soluble in a volatile organic setting agent by employment of such a setting agent having a saturation value of less than 75 milligrams per 100 cubic centimeters of solvent at 70° F.; and subsequently, for application as a brace, thoroughly wetting such fabric by a volatile organic setting agent in which the same is soluble, the setting agent being characterized by having a predetermined saturation limit for said plastic to gelatinize and dissolve part thereof without destroying the structure of the fabric, whereby upon allowing the solvent to evaporate there is formed a brace of substantially unyielding and inelastic construction.

5. In the process of making an orthopedic brace, the steps which comprise pre-shrinking a fabric formed of plastic fibers which is soluble in a volatile organic setting agent by employment of heated fluid at a temperature of between 350° F. and 425° F.; and subsequently, for application as a brace, thoroughly wetting such fabric by a volatile organic setting agent in which the same is soluble, the setting agent being characterized by having a predetermined saturation limit for said plastic to gelatinize and dissolve part thereof without destroying the structure of the fabric, whereby upon allowing the solvent to evaporate there is formed a brace of substantially unyielding and inelastic construction.

6. In the process of making an orthorpedic brace, the step which comprises thoroughly wetting a fabric formed of plastic fibers which is soluble in a volatile setting agent, the setting agent being characterized by having a saturation value for the plastic of between 50 milligrams and 150 milligrams per 100 cubic centimeters of setting agent at 70° F., whereby upon allowing the solvent to evaporate there is formed a brace of substantially unyielding and inelastic construction.

7. In the process of making an orthopedic brace, the step which comprises thoroughly wetting a fabric formed of cellulose acetate fibers which is soluble in a setting agent including therein acetone and a diluent which is a non-solvent for cellulose acetate, the setting agent being characterized by having a saturation value for the plastic of between 50 milligrams and 300 milligrams per 100 cubic centimeters of setting agent at 70° F., whereby upon allowing the solvent to evaporate there is formed a brace of substantially unyielding and inelastic construction.

ROGER ANDERSON.

REFERENCES CITED

The following references are of record in the file of this patent:

UNITED STATES PATENTS

| Number | Name | Date |
|---|---|---|
| 1,279,106 | Hall | Sept. 17, 1918 |
| 1,686,149 | Ellis | Oct. 2, 1928 |
| 1,719,173 | Dreyfus | July 2, 1929 |
| 1,786,421 | Buhlman | Dec. 30, 1930 |
| 1,828,397 | Dreyfus | Oct. 20, 1931 |
| 1,884,589 | Davies | Oct. 25, 1932 |
| 1,935,263 | Ellis | Nov. 14, 1933 |
| 2,006,540 | Dreyfus et al. | July 2, 1935 |
| 2,060,113 | Platt | Nov. 10, 1936 |
| 2,103,511 | Brown | Dec. 28, 1937 |
| 2,144,591 | Bux et al. | Jan. 17, 1939 |
| 2,156,491 | Daniels | May 2, 1939 |
| 2,158,110 | Dreyfus et al. | May 16, 1939 |
| 2,187,358 | Mellor | Jan. 16, 1940 |
| 2,191,534 | Mann et al. | Feb. 27, 1940 |
| 2,218,844 | Lovell | Oct. 22, 1940 |
| 2,252,999 | Wallach | Aug. 19, 1941 |
| 2,271,198 | Lyem | Jan. 27, 1942 |
| 2,277,049 | Reed | Mar. 24, 1942 |
| 2,282,274 | Weiswasser | May 5, 1942 |
| 2,296,379 | Croft | Sept. 22, 1942 |
| 2,308,511 | Hilliard | Jan. 19, 1943 |
| 2,308,593 | Brew | Jan. 19, 1943 |
| 2,315,002 | Lyem | Mar. 30, 1943 |
| 2,319,834 | Wallach | May 25, 1943 |
| 2,390,919 | Caron | Dec. 11, 1945 |